United States Patent Office 2,879,154

Patented Mar. 24, 1959

2,879,154

ACICULAR METAL PARTICLES AND METHOD OF MAKING THE SAME

Robert B. Campbell, Folcroft, Pa., assignor to The Franklin Institute of the State of Pennsylvania, Philadelphia, Pa., a corporation of Pennsylvania No Drawing. Application October 2, 1956
Serial No. 613,366

27 Claims. (Cl. 75—.5)

This invention relates to microscopic iron and iron oxide particles and methods for their production, and more particularly it relates to microscopic, monocrystalline iron and anhydrous iron oxide particles of acicular form, and novel methods for their production.

It is known that powders, basically composed of iron, when agglomerated under pressure, yield permanent magnets having a coercive force of about 400 oersteds and remnant induction to 5,500 gauss. Such powders can be obtained by causing a solution of an iron hydroxide or other salt to crystallize and then by decomposing the so obtained crystals and reducing them at low temperatures under controlled conditions.

An object of the present invention is the provision of a method for obtaining microscopic, iron particles of acicular form, which upon agglomeration yield permanent magnets of substantially improved quality, particularly in terms of greater coercive force and remnant induction.

Another object of the present invention is to provide microscopic iron particles having acicular form, which are particularly suitable for the manufacture of permanent magnets of greater coercive force.

Still another object of this invention is the provision of microscopic iron particles of acicular form and monocrystalline, and a method for their production.

A further object of this invention is the provision of microscopic, anhydrous iron oxide particles having acicular form, from which microscopic, iron particles of acicular form an be obtained.

A still further object of this invention is the provision of a method for producing microscopic, anhydrous iron oxide particles having acicular form.

Still another object of this invention is the provision of a permanent magnet of improved quality as regards coercive force and remnant induction form by the agglomeration and magnetization of microscopic iron particles of acicular form.

These and other objects of this invention will become more clearly apparent from a consideration of this specification and claims.

According to this invention, there are provided microscopic, acicular particles of iron which are particularly suitable for the manufacture of permanent magnets. These particles of iron are produced by a method which comprises heating microscopic, acicular, anhydrous iron oxide particles to an elevated temperature below about 300° C. in an atmosphere of a reducing gas. This invention also provides microscopic, acicular anhydrous iron oxide particles from which the microscopic iron particles may be formed. The microscopic, acicular, anhydrous iron oxide particles are produced by a method which comprises dehydrating microscopic, acicular hydrated iron oxide particles by heating the hydrated particles to an elevated dehydrating temperature, which dehydrating temperature is below about 200° C. until at least about one-fifth of the combined water of the hydrated iron oxide has been removed.

In accordance with a preferred form of this invention, microscopic, acicular, iron particles are made by a method which comprises heating microscopic, acicular, anhydrous iron oxide particles to a temperature between about 180° and about 200° C. in the presence of hydrogen at a hydrogen pressure of less than about 50 mm. of Hg until at least about 30% of the iron oxide has been reduced to iron. In this preferred embodiment of the invention, the hydrogen gas is derived, at least in part, from calcium hydride.

In making the acicular, microscopic, anhydrous iron oxide particles according to the preferred form of this invention, microscopic, acicular hydrated iron oxide particles are heated to an elevated dehydrating temperature, which dehydrating temperature is not greater than about 90° C. until at least about one-fourth the combined water of the hydrated iron oxide is removed. The dehydration of the hydrated iron oxide particles, according to a preferred embodiment, is conducted under subatmospheric pressures. By combining the latter described process for producing microscopic, acicular, dehydrated iron oxide particles with the earlier discussed method for producing microscopic, acicular iron particles, an overall process for the production of the latter mentioned iron particles is thereby provided.

The above-described methods for producing microscopic, acicular iron particles and microscopic, acicular, anhydrous iron oxide particles, respectively, produce particles which are also monocrystalline in nature if the respective particles treated by these methods are also monocrystalline. For example, by the dehydration method of this invention, microscopic, acicular, monocrystalline hydrous iron oxide particles may be dehydrated to microscopic, anhydrous, monocrystals of iron oxide of acicular form. Similarly, by the reducing method of this invention microscopic, acicular, monocrystalline, anhydrous iron oxide particles may be transformed into metallic monocrystals of corresponding shape and size.

A permanent magnet comprising an agglomerated body of microscopic, acicular iron particles, which preferably are monocrystalline, is also within the scope of this invention. Preferably, the microscopic, acicular iron particles which are agglomerated to form a permanent magnet will have a length of from about 300 A. to about 5000 A., a width of from about 150 A. to about 2000 A., and a length to width ratio of from about 2:1 to about 8:1.

According to this invention, there are provided microscopic, acicular iron particles which posses superior magnetic properties. Because they are acicular or needle-like in configuration, they possess greatly enhanced magnetic properties due to the phenomenon known as shape anisotropy. In addition, because the particles are extremely small in size, their size being generally about the same as or not far removed from that particle size which energy considerations have shown to be critical for a particle to be a single-domain particle, the chances are greatly increased that the particles of the instant invention will be single-domain particles, i.e., particles whose magnetic moments are oriented in a single direction and thus possess greater coercive force. In those microscopic, acicular iron particles which are also monocrystalline, the ordered magnetic vectors which the particles will tend to possess, need not pass across regions of crystal disorder, which may exist in a multi-crystal particle. Also, between two neighboring crystals, the direction of easy magnetization for one crystal may be at a large angle to the other; thus, in a multi-crystal particle, to have the magnetic moments lined up across the crystal boundary, between adjacent crystals, a large amount of energy is required to pull the moments out of the direction of minimum energy. On the other hand, a single- crystal, wherein there is an ordered array of atoms, only a minimum of energy is required to obtain an ordered array of magnetic moment vectors to provide a single-domain particle.

Applicant has found that microscopic hydrated iron oxide particles, which are acicular in form and of proper size, may be dehydrated to form microscopic, acicular anhydrous iron oxide particles from which the desired microscopic, acicular iron particles may be formed. The novel method by which the hydrated acicular iron oxide particles are dehydrated to form microscopic, acicular anhydrous iron oxide particles, and the method by which the latter particles are reduced to form microscopic, acicular iron particles are essential parts of this invention.

A preferred method for obtaining microscopic, anhydrous iron oxide particles of the desired size and which are acicular in form, from which microscopic, acicular iron particles of the desired size may be produced, comprises dehydrating microscopic hydrated, acicular iron oxide particles. The hydrated iron oxide particles may be produced by a well known method in which they are deposited from an iron salt solution onto minute seed particles. The seed material upon which the iron oxide hydrate is deposited may comprise a sol produced by adding ammonium hydroxide to ferric chloride to form a rich, red sol and dialyzing the sol until the quantity of free chlorine ($Cl^-$) and ferric iron ($Fe^{+++}$) ions present is negligible. A sol so produced has a particle size so small that the chemical composition of the sol is not known. Neither does it have an X-ray diffraction pattern, and the particles are not resolved in an electron microscope. The deposition of iron oxide hydrate onto the small seed particles of the sol may best be expressed by the following equation:

$$2Fe^{++} + 3H_2O + \frac{1}{2}O_2 \rightarrow Fe_2O_3.H_2O + 4H^+ \quad (I)$$

$$2Fe + 4H^+ \rightarrow 2Fe^{++} + 2H_2 \quad (II)$$

In these equations the anions which may be for example $Cl^-$, $SO_4^-$ and the like, have not been written in these equations since essentially they take no part in the reactions. The oxygen of Equation I may be provided by bubbling an oxygen-containing gas through the solution of iron salt, and the iron of Equation II may be provided by the addition of metallic iron. Since the ultimate size of the iron particles which are to be obtained is controlled to a large degree by the size of the iron oxide hydrate particles, it is essential that the method for producing the iron oxide hydrate particles be so controlled as to produce particles of the desired size. Size control of iron oxide hydrate particles is a function of the amount of seed material employed in the solution of iron salt, and also of reaction time. Generally, from about 0.2 gram to about 4.0 grams, and preferably from about 1.0 gram to about 2.0 grams of seed particles, are employed per mole of ferrous salt employed. Reaction time generally should not exceed about 6 hours, and preferably is within the range between about 3 and about 3½ hours. If the reaction time is substantially in excess of 6 hours, hydrated iron oxide particles of a size greater than that required for the production of iron particles of the desired size are obtained.

As stated above, the microscopic, acicular iron particles, which of course may also be monocrystalline, are formed by reducing microscopic, acicular anhydrous iron oxide particles. According to this invention, there is provided a method by which microscopic, acicular, hydrated iron oxide particles may be dehydrated so that they will retain their acicular form, and also their monocrystalline character should they initially possess such crystalline structure. This method comprises heating the hydrated iron oxide particles to an elevated dehydrating temperature which is below about 200° C. until at least about one-fourth of the combined water of the hydrated iron oxide is removed. By the expression "elevated temperatures" is meant temperatures above normal temperatures, and preferably temperatures above about 170° C. It has been found that if the initial stages of dehydration are carried out at temperatures above about 200° C., the particles become spherical and change to red iron oxide, alpha-$Fe_2O_3$. On the other hand, if the hydrated iron oxide particles are heated to a temperature below about 200° C. until about one-fifth of the combined water has been driven off, the particles do not lose their acicular shape, and their monocrystalline character, if they possess such, even if temperatures as high as about 400° C. are employed to complete the dehydration.

A preferred method for conducting the dehydration is to employ a water vapor pressure which is below the vapor pressure of water at the dehydrating temperature employed, as for example by conducting the dehydration under subatmospheric pressures or vacuum. In such case, a dehydration temperature not greater than about 180° C. and preferably not greater than about 90° C. may be employed until at least about one-fourth of the combined water of the hydrated iron oxide has been removed. Methods for determining the amount of combined water removed are well known to the analytical chemist.

The iron oxide particles produced by the above dehydration method are acicular in character, and if the hydrated particles from which they are produced are monocrystalline, they will also be monocrystalline. In addition, the individual dehydrated particles have dimensions which vary but little from the average particle size of a sample of a powder formed of the particles. The dehydrated iron oxide particles will generally consist of beta-$Fe_2O_3$. As mentioned above, the microscopic, acicular iron particles of this invention are obtained by heating the aforementioned dehydrated iron oxide particles to an elevated temperature below about 300° C. in an atmosphere of a reducing gas. It was found that in order to prevent the particles from losing their acicular shape by becoming spherical or by becoming sintered together with other particles during reduction to metallic iron, it is essential that the reaction temperatures not exceed about 300° C. Since the rate of reduction is extremely slow below about 125° C., temperatures within the range between about 125° C. and 300° C. should be employed. Preferably, reduction is conducted at a temperature between about 180° and 200° C.

Another factor in the reduction step which is important to obtaining microscopic, iron particles of acicular shape is the pressure of the atmosphere of reducing gas employed. It was found that if during the initial stages of reduction a reducing gas pressure in excess of about 100 mm. of Hg is employed, the reaction proceeds so vigorously as to become uncontrollable resulting in a sharp temperature increase. Because of the sharp temperature increase, the iron particles may become sintered together or lose their acicular form. Thus, it was found that if the pressure of the reducing gas is maintained at less than about 100 mm. of Hg until at least 20% of the iron oxide has been reduced to iron, and preferably to a pressure of less than about 50 mm. of Hg until at least about 30% of the iron oxide has been reduced to iron particles of iron of the desired dimensions and acicular in form are produced. By this reduction method, if the iron oxide hydrate particles are monocrystals, the iron particles produced thereby will also be monocrystals. Methods for determining the degree to which the reduction has progressed are well known to the skilled chemist or physicist.

If desired, an inert material such as silica ($SiO_2$) may be mixed with the iron oxide particles during the reduction process. The inert material serves as a separation matrix between the iron particles, keeping the iron particles separated during and after reduction, as well as aiding in the control of the rate of reduction. Also, the separation of the iron particles enhances the magnetic behavior by reducing the interaction between particles.

In reducing the acicular iron oxide particles to acicular iron particles, the reducing gas may be any of the reducing gases which will reduce iron oxide to iron. Examples of such reducing gases are hydrogen, carbon monoxide, water-gas, and the like. The preferred reducing gas is hydrogen. When hydrogen is employed as the reducing gas, one mole of water is produced for each mole of iron oxide reduced according to Equation III below:

$$FeO + H_2 \rightleftarrows Fe + H_2O \quad \text{(III)}$$

In order to remove this water which tends to react with the iron to form iron oxide, preheated hydrogen gas may be passed through a bed of the oxide. The hydrogen gas reduces the oxide and carries away the water vapor from the bed of material being treated as formed. The provision of a deliquescent material in the bed of iron oxide particles may also aid in the removal of water.

According to a preferred embodiment of this invention, hydrogen gas is provided, at least in part, and preferably entirely, by means of a metal hydride, as for example a hydride selected from the group consisting of alkali metal and alkaline earth metal hydrides. Suitable alkali metal hydrides include sodium and potassium hydride. The preferred hydride is calcium hydride. Calcium hydride reacts with water to form hydrogen gas and calcium oxide according to Equation IV:

$$CaH_2 + H_2O \rightarrow CaO + 2H_2 \quad \text{(IV)}$$

By mixing calcium hydride with the iron oxide, the reaction begins almost immediately, since generally there is a minute amount of water present in the iron oxide particles which aids in initiating the reaction. It is evident from Equations III and IV, that once the reaction between calcium hydride and water is begun it continues to progress until either all of the iron oxide or all of the calcium hydride has been consumed, since the hydrogen formed by reaction between calcium hydride and water further reacts with the iron oxide to produce additional water which in turn reacts with the calcium hydride to produce the required hydrogen.

The reduced hydrogen pressures required and previously described can be obtained by conducting the reduction under ordinary pressures, but under a partial pressure of hydrogen or other reducing gas, the remainder of the pressure being attributable to an inert gas. Of course, reduction can be carried out in the presence of hydrogen with a substantial absence of other gases if the pressure in the reaction zone is reduced to provide a hydrogen pressure below about 100 mm. of Hg, until about one-fifth of the iron oxide has been reduced to iron.

Because of the excellent magnetic properties of the microscopic, acicular iron particles of this invention, particularly those particles which are also monocrystalline, they are particularly suitable for the manufacture of permanent magnets of high quality through agglomeration and magnetization. The remanence of magnets formed from the particles of this invention, conditions of manufacture being equal, is substantially higher than that of magnets obtained from other types of iron particles. The agglomeration of the iron particles with a view to the manufacture of magnets can take place with or without the use of a binding agent, but must be effected at a temperature which is sufficiently low in order to prevent, as far as possible, any sintering of the grains. The pressure employed must be of a sufficiently high order to provide the agglomerated body with satisfactory mechanical characteristics, yet must not be too high since otherwise the coercive force obtained on the agglomerated body would be too small. In one procedure, an iron powder composed of the mircoscopic, acicular and preferably monocrystalline, iron particles may be thoroughly mixed with an organic resin binder, such as an epoxy or phenolic resin, and the powder and resin binder pressed in a die under pressures from about 500 lbs. per sq. inch to about 50,000 lbs. per sq. inch. The resulting body may be lacquered for mechanical strength and permanently magnetized by an electromagnet. Prior to the application of pressure, it may be desirable to place the iron powder and resin binder in the magnetic field to align the particles, thereby essentially making the moments of the majority of particles point in the same direction. Also, it may be desirable to dilute the iron powder with a non-magnetic filler such as sand, which aids in separation of the iron particles, thereby reducing interaction effects.

The following examples further illustrate the advantages of this invention, but are not intended to limit the scope of this invention.

EXAMPLE I

To 3000 cc. of a 1 molar ferrous chloride solution containing excess iron are added to 210 cc. of a rich red sol, which was prepared by adding 15 normal ammonium hydroxide to 1 molar ferric chloride and removing excess free chlorine ($Cl^-$) and ferric iron ($Fe^{+++}$) ions present. Air was bubbled through this solution for a period of 6½ hours at a temperature of about 60° C., and iron oxide hydrate was deposited onto the small seed particles of the sol. The precipitated material was then dried at about 100° C. The precipitated material was identified as beta-$Fe_2O_3.H_2O$ by X-ray diffraction methods, and electron micrographs indicated the particles to be acicular in character having a width of about 150 A. and a length of about 800 A., representing a length to width ratio of about 5.3:1. According to these X-ray diffraction methods, the line broadening in various crystallographic directions indicated that the particles had a crystal size which is comparable to the size of particles as determined by the electron microscope, indicating the probable monocrystalline nature of the particles.

3 grams of the acicular beta-$Fe_2O_3.H_2O$ particles were heated under a vacuum for about 24 hours at 180° C. after which they were further heated at a temperature of 330° C. for an additional 4 hours. By this treatment the hydrated iron oxide particles were dehydrated, and electron micrographs showed the dehydrated iron oxide particles to have the same acicular shape as did the hydrated iron oxide particles from which they were derived.

The dehydrated acicular iron oxide particles were mixed with calcium hydride ($CaH_2$) and the mixture was maintained at 180° C. for about 80 hours. During the first 14 hours the initial pressure of hydrogen, formed by the reaction of calcium hydride with the iron oxide, was maintained at about 50 mm. of Hg. During the final 66 hours of the reduction process, a hydrogen pressure of from about 760 to 800 mm. of Hg was employed. The reduced iron oxide particles were washed with benzene to remove any excess calcium hydride or calcium hydroxide remaining with the particles. (Electron micrographs showed the iron particles to have essentially the same acicular shape as the initial beta-$Fe_2O_3.H_2O$.) The powder was identified as being substantially pure iron by X-ray diffraction techniques, and the crystal size of the 110 line was 430 A. According to the X-ray diffraction techniques employed, the line broadening in various crystallographic directions indicates that the particles have a crystallite size which is comparable to the size of the particles as determined by the electron microscope, indicating the probable monocrystalline nature of the particles.

The coercive force of the acicular iron particles was measured by packing the metal powder in a glass tube with Duco cement and measuring the oersteds on a Sanford-Bennett High-H permeameter. A reading of 864 O. was obtained for the material of this example.

EXAMPLE II

A portion of the Beta-$Fe_2O_3$ of Example I was reduced at a temperature of about 225° C. for about 24 hours. After treatment of the reduced product with benzene to remove excess calcium hydride, calcium hydroxide, and/or calcium oxide, the particles were packed in a glass tube with Duco cement and the coercive force is measured with a Sanford-Bennett High-H permeameter. A coercive force of 500 O. was obtained. The crystal size was determined by X-ray methods to be 680 A., and an electron micrograph showed that some of the particles were acicular, but also that some of them were nearly spheres.

A series of examples were conducted in the manner set forth in Example I, and the results obtained are set forth in Table I.

*Table I*

| Example | Iron Crystal Size (110) A. | Iron Oxide Hydrate Initial Length to Width Ratio | Coercive Force, O | |
|---|---|---|---|---|
| | | | Acicular Iron of Examples | Sph. Iron of Same Line Broadening |
| IV | 682 | 6-1 | 550 | 150-200 |
| V | 400 | 6-1 | 806 | 400 |
| VI | 430 | 6-1 | 864 | 400 |
| VII [1] | 180 | 6-1 | 1,400 | 700 |

[1] Mixed with silica.

A review of the results tabulated in Table I clearly shows that the iron particles produced according to the method of this invention possess greatly superior coercive forces.

I claim:

1. A microscopic, acicular, monocrystalline iron particle.

2. An iron particle according to claim 1 having a length of from about 300 A. to about 5000 A., a width of from about 150 A. to about 2000 A., and length to width ratio of from about 2:1, and 8:1.

3. A method for making a microscopic, acicular iron particle which comprises heating a microscopic, acicular, anhydrous iron oxide particle to an elevated temperature below about 300° C. in an atmosphere of a reducing gas.

4. The method of claim 3 in which said iron oxide particle is heated to a temperature between about 125° and about 300° C.

5. The method of claim 3 in which the reducing gas is maintained at a pressure of less than about 100 mm. of Hg until at least about 20% of said iron oxide is reduced to iron.

6. The method of claim 3 in which said reducing gas is maintained at a pressure of less than about 50 mm. of Hg until at least about 30% of said iron oxide is reduced to iron.

7. The method of claim 6 in which said iron particle is heated to a temperature between about 180° and about 200° C.

8. The method of claim 7 in which the reducing gas comprises hydrogen.

9. The method of claim 8 in which said hydrogen gas is derived at least in part from a metal hydride selected from the group consisting of alkali metal and alkaline earth metal hydrides.

10. The method of claim 9 in which the metal hydride is calcium hydride.

11. A method for making a microscopic, acicular, monocrystalline iron particle which comprises heating a microscopic, acicular, monocrystalline iron oxide particle to a temperature between about 180° and about 200° C. in an atmosphere of hydrogen gas maintained at a pressure of less than about 50 mm. of Hg until at least about 30% of said iron oxide is reduced to iron, said hydrogen gas being derived at least in part from calcium hydride.

12. A method for dehydrating a hydrous, microscopic, acicular iron oxide particle to obtain an anhydrous, microscopic, acicular iron oxide particle which comprises heating said hydrous iron oxide particle to an elevated dehydrating temperature, said dehydrating temperature being below about 200° C. until at least about one-fifth of the combined water of said hydrated iron oxide has been removed.

13. The method of claim 12 in which said dehydrating temperature until at least about one-fifth of the combined water of said hydrated iron oxide is removed is not greater than about 180° C. and the dehydration is conducted at a water-vapor pressure below atmospheric pressure.

14. The method of claim 12 in which said dehydrating temperature until at least about one-fourth of the combined water of said hydrated iron oxide is removed is not greater than about 90° C. and the dehydration is conducted under subatmospheric pressure.

15. A method for making a microscopic, acicular iron particle which comprises dehydrating a microscopic, acicular hydrated iron oxide particle to form a microscopic, acicular dehydrated iron oxide particle by heating said hydrated iron oxide particle to an elevated dehydrating temperature, said dehydrating temperature being below about 200° C. until at least about one-fifth of the combined water of said hydrated iron oxide has been removed, and thereafter heating said dehydrated iron oxide particle to an elevated temperature below about 300° C. in an atmosphere of a reducing gas.

16. The method of claim 15 in which said dehydration temperature until at least about one-fifth of the combined water of said hydrated iron oxide has been removed is not greater than about 180° C. and the dehydration is conducted at a water-vapor pressure below atmospheric pressure.

17. The method of claim 15 in which the reduction is carried out at a temperature between about 125° and about 300° C.

18. The method of claim 15 in which said reducing gas is maintained at a pressure of less than about 100 mm. of Hg until at least about 20% of said iron oxide has been reduced to iron.

19. The method of claim 15 in which said reducing gas is maintained at a pressure less than about 50 mm. of Hg until at least about 30% of said iron oxide has been reduced to iron.

20. The method of claim 19 in which said dehydrated iron oxide particle is heated to a temperature between about 180° and about 200° C.

21. The method of claim 20 in which said reducing gas comprises hydrogen.

22. The method of claim 21 in which said hydrogen gas is derived at least in part from a metal hydride selected from the group consisting of alkali metal and alkaline earth metal hydrides.

23. The method of claim 22 in which the hydrogen gas is derived at least in part from calcium hydride.

24. The method of claim 23 in which the dehydrating temperature until about one-fourth of the combined water of said hydrated iron oxide is removed is less than about 90° C. and the dehydration is conducted at subatmospheric pressure.

25. A method for making a microscopic, acicular, monocrystalline iron particle which comprises dehydrating a microscopic, acicular, monocrystalline, hydrous iron oxide particle to obtain a microscopic, anhydrous, acicular, monocrystalline iron oxide particle, by heating said hydrated iron oxide particle to an elevated temperature under subatmospheric pressure, said dehydrating temperature being not greater than about 90° C. until at least about one-fourth of the combined water of said hydrated iron oxide is removed, and thereafter heating said anhydrous iron oxide particle to a temperature between about 180° and about 200° C. in an atmosphere of hydrogen gas maintained at a pressure of less than about 50 mm. of Hg until at least about 30% of said iron oxide is reduced to iron, said hydrogen gas being derived, at least in part, from calcium hydride.

26. A permanent magnet comprising an agglomerated body of microscopic, acicular iron particles having a length of from about 300 A. to about 5000 A., a width of from about 150 A. to about 2000 A., and a length to width ratio of from about 2:1 to about 8:1.

27. The permanent magnet of claim 26 in which said iron particles are monocrystalline.

References Cited in the file of this patent

UNITED STATES PATENTS

| | | |
|---|---|---|
| 2,660,523 | De Lollis | Nov. 24, 1953 |

FOREIGN PATENTS

| | | |
|---|---|---|
| 590,392 | Great Britain | July 16, 1947 |
| 610,514 | Great Britain | Oct. 18, 1948 |
| 725,298 | Great Britain | Mar. 2, 1955 |
| 726,264 | Great Britain | Mar. 16, 1955 |

OTHER REFERENCES

Indust. Chemist., November 1946, 22, pages 680–685.

Academie des Sciences Comptes Rendus, T. 229, Aug. 8, 1949, pages 417–419.

Phys. Rev., Mar. 1, 1950, 77, page 725.

Elect. Eng., vol. 71, No. 5, May 1952, pages 447–51.

Metallurgia, 52, 312, October 1955, pages 165–168.